US006568070B1

(12) United States Patent
Eaton et al.

(10) Patent No.: US 6,568,070 B1
(45) Date of Patent: May 27, 2003

(54) FRONT SIDE SINGLE PIN EXTRACTION TOOL

(75) Inventors: Michael Lee Eaton, Pine Island, MN (US); Gregory Jay Geilow, Eyota, MN (US); Michael Lee Graham, Rochester, MN (US); Jeffrey C. Shonkwiler, Saint Bonifacius, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/116,228

(22) Filed: Apr. 4, 2002

(51) Int. Cl.[7] .................................................. B23P 19/00

(52) U.S. Cl. ............................ 29/762; 29/758; 29/764; 29/739; 29/762

(58) Field of Search ....................... 29/837, 845, 426.1, 29/226.5, 426.6, 762, 764, 278, 280, 758, 739

(56) References Cited

U.S. PATENT DOCUMENTS 4,070,755 A * 1/1978 Carter ........................ 173/120
4,168,569 A * 9/1979 Fairbairn ..................... 29/758
4,285,123 A * 8/1981 Chisholm .................... 29/258
6,098,276 A * 8/2000 Espiritu ....................... 29/747
6,279,216 B1 * 8/2001 Halliday et al. .............. 29/278

* cited by examiner

*Primary Examiner*—Carl J. Arbes
*Assistant Examiner*—Tai Nguyen
(74) *Attorney, Agent, or Firm*—Robert W. Lahtinen

(57) ABSTRACT

A front side extractor is shown which removes single connector pins from connectors utilizing high pin densities. The tool includes a sleeve that is aligned with a pin to be extracted and advanced to surround the pin. A shaft with a terminal wedge surface is then advanced through the sleeve to wedge the pin against the inner surface of the sleeve and capture the pin, thereby allowing the pin to be extracted as it is retracted, in unison with the tool, away from the connector. To enhance the ability of the tool to capture the pin, the sleeve inner surface is roughened to increase the frictional force retaining the pin against the sleeve wall surface.

11 Claims, 4 Drawing Sheets

FRONT SIDE SINGLE PIN EXTRACTION TOOL

FIELD OF THE INVENTION

This invention pertains to a front side extractor tool for removing single pins from a connector to enable pin replacement and more particularly to an extraction tool for removing pins from connectors having high density, closely spaced pin structures.

BACKGROUND OF THE INVENTION

When making, assembling or using connectors with a dense array of connector pins, especially those connectors using compliant pins, it is often expedient to remove and replace single connector pins to reclaim devices with only one or a few broken or defective pins. This replacement becomes more necessary as connectors have become more expensive and complex with densities of hundreds of pins. Further, when compliant pin connectors are used which are a one time connection, it is essential that a single pin be replaced without the disconnection and replacement of the entire connector.

Single pin removal was not difficult when a device used only a few pins. Under such conditions a needle nose pliers could seize and enable removal of a single pin. However, such a procedure is not effective to remove pins from connectors using current state of the art pin densities. Existing pin extractors may use constricting jaws that seize opposite sides of the pin or are positioned behind a pin projecting portion to permit the tool and pin to be drawn away in unison from the connector. Another mode of pin extraction is the use of a tool that is formed with the jaws of a chuck at the end of a shaft which are caused to constrict about a pin by sliding a sleeve or other member that induces radially inward movement of the jaws of the chuck. These devices, although effective, are of limited use in high density, current state of the art connector applications where adjacent pins within a matrix of rows and columns have center line to center line spacings of two millimeters and distances between adjacent pin surfaces of no more than one millimeter and where the connector often includes shields or blades between adjacent rows of pins, further reducing the clearance surrounding individual pins. In such confined spaces, current extraction tool designs make it difficult to remove a single pin without compromising the structural integrity of adjacent pins or other adjoining structure.

SUMMARY OF THE INVENTION

The front side pin extractor of the present invention uses a sleeve which has an inner diameter large enough to permit it to be aligned with a selected pin to be removed and advanced to surround the pin with the end or nose abutting the connector body at the base of the pin. A wedge pin, which has an outer diameter substantially the same as the inner diameter of the sleeve, but with sufficient clearance to permit ease of movement axially within the sleeve, is used to drive a terminal end wedge surface between the sleeve and the pin. The terminal end of the wedge pin is an extended surface formed as a planar surface which forms an angle of about 11 degrees with the axis of the pin. To enhance the frictional force retaining the wedged pin within the sleeve, the inner sleeve surface surrounding the pin is rough or irregular. This roughened surface can be achieved either not finishing the sleeve inner surface during fabrication or actively working the surface to achieve the desired roughened surface.

The extractor tool is shown as a body portion including a flange at one end and a sleeve that is aligned with and advanced to surround a defective pin to be removed at the opposite end. Formed as a single piece, the body includes a bore or central opening extending axially therethrough with an enlarged portion within the flange and the principal length of the body and a reduced diameter within the terminal sleeve portion. A plunger or shaft with a diameter similar to the body axial bore, but sufficiently smaller to enable the shaft to slide axially within the body bore, is received within the body central opening and further includes a reduced diameter shaft extension which is received within the body portion sleeve and functions as the wedge pin with the terminal wedging surface integral therewith. At the opposite end, the shaft includes an integral knob of substantially the same outer diameter as the body portion flange. As a hand tool, the body portion sleeve is aligned with a single pin to be removed and extended to surround the pin and abut the connector body. The shaft knob and body portion flange can then be forced toward one another to cause the wedge pin to clamp the connector pin against the inner wall of the sleeve and allow the extractor tool to be withdrawn from the connector, causing the pin to move in unison therewith and be extracted from the connector.

BRIEF DESCRIPTION OF THE DRAWINGS

FIG. 7 is a vertical section of the connector of FIG. 6 taken along line 7—7 of

DETAILED DESCRIPTION

Figure 1:
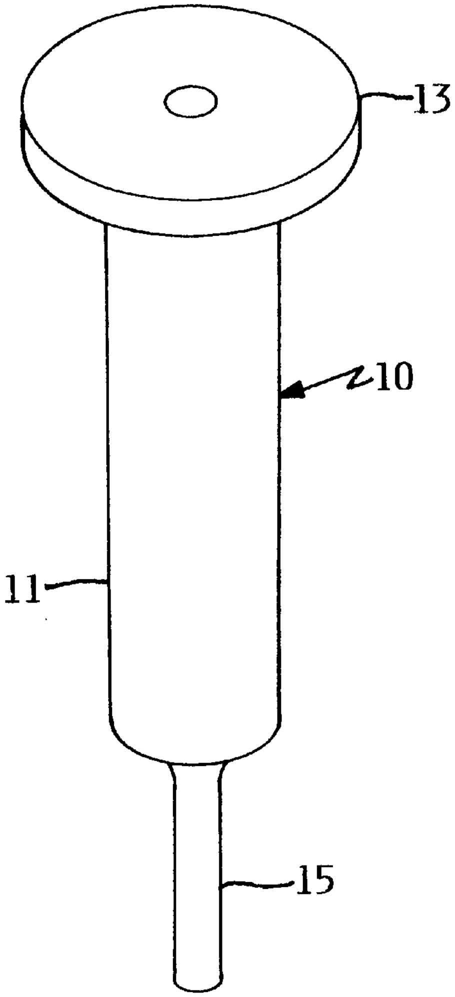
FIG. 1 is a perspective view of the body portion of the extraction tool of the present invention.
Figure 2:
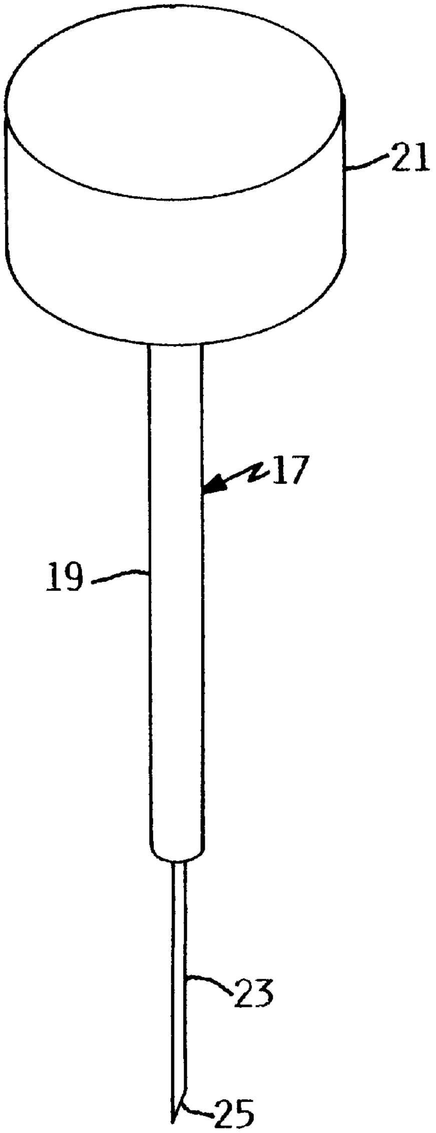
FIG. 2 is a perspective view of the plunger portion of the extraction tool of the present invention.

The extraction tool of the present invention includes two principal portions. FIG. 1 shows a body portion 10 that includes a central portion 11 with an increased diameter upper end flange 13 and a lower tubular sleeve 15. The other principal component of the extractor tool is shaft 17 shown in FIG. 2 which includes a central shaft 19 having a larger diameter knob 21 at the upper end and a reduced diameter shaft extension 23 at the lower terminal end which presents a wedge surface 25 at the end. The wedge surface 25 is inclined at an angle of about 11 degrees to the axis of the shaft 17 to form an extended wedging surface.

Figure 3:
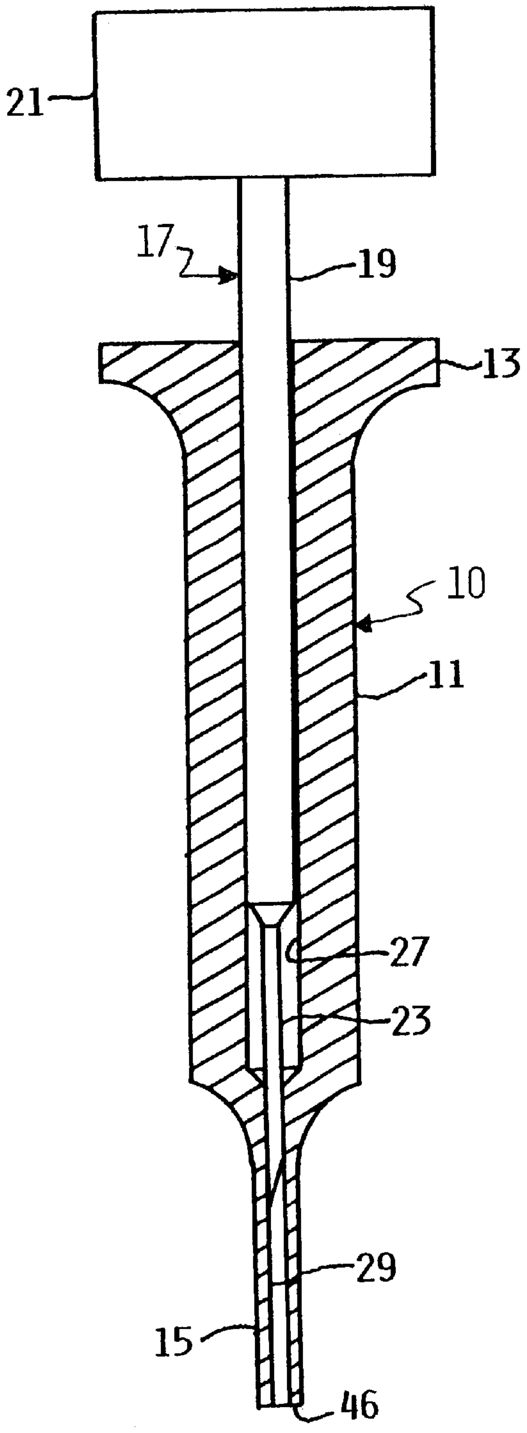
FIG. 3 is a side elevation of the assembled extraction tool with the body portion shown in axial section.

FIG. 3 shows the body 10 and shaft 17 of the tool assembled with the body portion 10 in axial section. The body 10 has an upper axial bore 27 in which the larger diameter shaft portion 19 is received and closely confined to allow reciprocating, sliding motion. The reduced diameter lower end portion 23 of shaft 17 is received in the sleeve bore 29 of the body 10.

Figure 7:
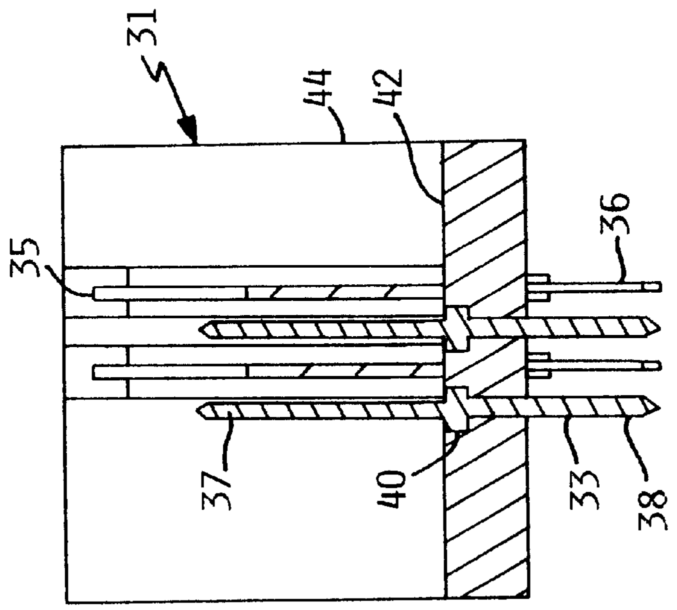
Figure 6:
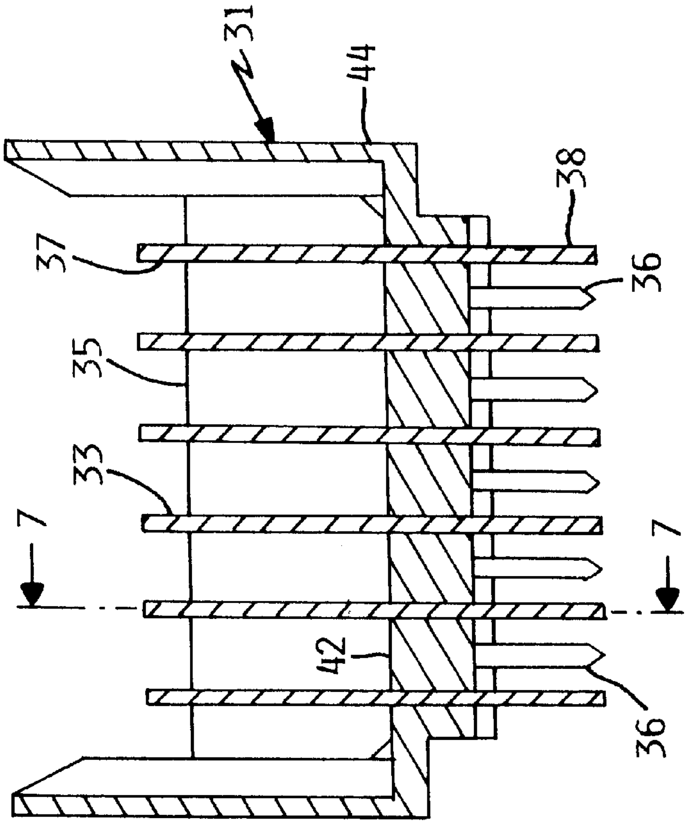
FIG. 6 is a vertical section of a typical high pin density connector taken through a row of connector pins.

FIGS. 6 and 7 are much enlarged section views of a typical high density connector 31 employing rows and columns of compliant connector pins 33. FIG. 6 is a section taken through a row of six aligned compliant pins 33. Typically, such connectors include twenty five 6 or 8 pin rows to have 150 or 200 connector pins in each connector with multiple connectors aligned to afford 600 or more pin connections. The connector shown also includes a shield or blade 35 between each adjoining pair of six pin rows which further reduces the clearance about individual pins 33. In the actual connector, adjoining pins 33, in rows of six and columns of twenty five, have center to center spacings of about 2 millimeters. Thus the tool sleeve portion 15 must be of limited diameter to avoid interference with or damage to adjacent pins. Likewise, the sleeve wall should be thin to optimize the clearance between the sleeve cylindrical inner wall surface 48 and pin contact 37 to facilitate alignment and insertion about the pin portion 37. The pins 33, as shown, include a pin contact 37 at one end and a compliant connector portion 38 (shown schematically) at the opposite end. Similarly, each blade or shield 35 has connector portions extending through and captured by the connector body 44 and terminating as a row of compliant connector portions 36 disposed between adjacent rows of compliant connector portions 38 of pins 33. The intermediate portion of each pin 33, which is within and captured by the body of the connector includes an enlarged portion 40 adjacent the upper surface 42 of the connector body 44. The enlarged portion 40 requires that the pin 33 be extracted for replacement from the front side (upper surface 42 as shown) of the connector 31.

Figure 4:
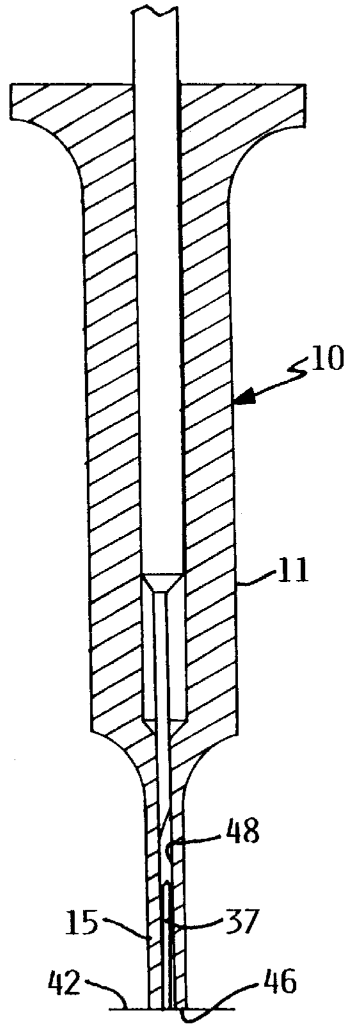
FIG. 4 is similar to FIG. 3 with the tool plunger partially broken away and the body sleeve portion surrounding a connector pin that is to be captured.

In FIG. 4, the assembled extraction tool is shown with the lower end surface or nose 46 of sleeve 15 abutting the connector body upper surface 42 and surrounding a connector pin 37 which is to be extracted. The inner surface 48 of sleeve 15 closely confines, but loosely surrounds pin connector 37 to permit the tool sleeve 15 to be manually aligned with and inserted about pin connector 37.

Figure 5:
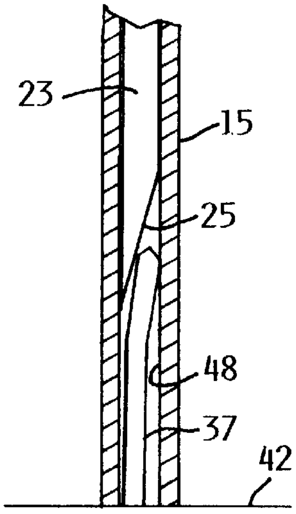
FIG. 5 illustrates the body sleeve portion surrounding a pin to be extracted and the plunger shaft wedge surface advanced to wedge the connector pin against the inner surface of the sleeve.

FIG. 5 shows the pin connector 37 captured by the extraction tool following downward movement of the shaft reduced diameter terminal end portion 23 within the bore of the sleeve 15 causing the shaft wedge surface 25 to confine and capture pin connector 37 against the inner surface 48 of sleeve 15. To increase the retention between the pin connector 37 and the sleeve inner surface 48, the sleeve inner surface 48 is roughened to increase the friction between pin and bore surfaces. The rough surface can be achieved either by not finishing the bore surface 48 or by preparing the surface to achieve a desired roughness or irregularity while allowing the reduced diameter shaft portion 23 to be readily reciprocated therein.

The pin is extracted by withdrawing the tool and captured pin 33 in unison away from the connector body 44. The tool is effective for the front side extraction of single pins for replacement with respect to either the independent connector or a connector which is installed with the pin compliant connector portions 38 received in the cooperating plated vias of a host printed circuit board.

The foregoing description of an embodiment of the invention has been presented for purposes of illustration and description. It is not intended to be exhaustive or limit the invention to the precise form disclosed. Many modifications and variations are possible in light of the above teaching. It is intended that the scope of the invention be limited not by the description and illustrations, but rather by the claims appended hereto.

What is claimed is:

1. A front side extraction tool for removing a single pin from a multiple pin electrical connector comprising a sleeve which at one end continuously surrounds a bore of substantially constant diameter that extends axially inward from said one end and is defined by a first cylindrical surface;

a shaft having a first end portion radially confined by and axially movable within said sleeve axially extending bore; and said shaft presenting a terminal end surface at said first end with a perimeter axially aligned with the periphery of said shaft first end portion which forms an acute angle with the shaft axis and includes a distal end that terminates at the shaft periphery as a wedge surface adjacent said sleeve first cylindrical surface whereby, when said sleeve surrounds a pin to be extracted from an electrical connector, said shaft can be axially advanced to force said wedge surface between such pin and said sleeve first cylindrical surface to wedge such pin against said sleeve surface and enable said shaft and said sleeve and such pin to be moved in unison away from said electrical connector to remove such pin from said electrical connector.

2. The extractor tool of claim 1 wherein said sleeve first cylindrical surface is rough to enhance the frictional contact between said sleeve first cylindrical surface and a connector pin wedged against said surface by said shaft wedge surface.

3. The extractor tool of claim 2 wherein said sleeve end opposite said one end includes an enlarged flange and said shaft end, axially remote from the end which presents said wedge surface, includes an integral flange, whereby when said shaft integral flange is moved toward said sleeve flange, said shaft is advanced through said sleeve.

4. The extractor tool of claim 3 wherein said sleeve between said one end and said flange has an enlarged outer diameter and an enlarged bore axially aligned with said sleeve first cylindrical surface and said shaft includes an increased diameter portion between said first end portion and said shaft integral flange that is slidably received in and guided by the cylindrical surface which defines said sleeve enlarged bore.

5. The extractor tool of claim 4 wherein said sleeve at said one end terminates in an annular surface which defines a plane perpendicular to the axis of said sleeve.

6. The extractor tool of claim 5 wherein said shaft wedge surface is a planar surface that is inclined to the axis of said shaft at an angle of between ten and fifteen degrees.

7. An extractor tool for removing a single pin from a multiple pin electrical connector comprising a body member having a sleeve portion at one terminal end which continuously surrounds a bore of constant diameter that extends axially inward from said one terminal end and is defined by a first cylindrical surface;

a plunger member having a shaft received in and axially slidable within said body member bore and including a first terminal end received in said body member axially extending bore; and a wedge surface, formed as the terminal end surface of said plunger member shaft with the perimeter thereof axially aligned with the periphery of said shaft, which defines an acute angle with the axis of said shaft and presents a leading edge closely adjoining said body member first cylindrical surface, whereby, when said sleeve is aligned with a pin which is to be removed from an electrical connector and advanced to surround such pin, the shaft is axially advanced to cause such pin to be captured between the said body member first cylindrical surface and said shaft wedge surface and allow such pin to be removed as said extraction tool is removed from the connector of which such pin forms a part.

8. The extractor tool of claim 7 wherein said body member first cylindrical surface is rough to enhance the frictional contact between said first cylindrical surface and a connector pin wedged against said first cylindrical surface by said shaft wedge surface.

9. The extraction tool of claim 8 wherein said sleeve is a thin walled tubular portion formed as an integral part of said body member.

10. The extraction tool of claim 9 wherein said body member has an enlarged diameter which surrounds an increased diameter bore extending from said sleeve and terminates in a radially extending flange at the end opposite said one terminal end and said plunger includes an intermediate increased diameter shaft portion received in said increased diameter bore and terminates at the end opposite said first terminal end in a radially extending flange, whereby, when said plunger flange is moved toward said body member flange, said shaft first terminal end is advanced through said sleeve portion.

11. The extractor tool of claim 10 wherein said shaft wedge surface is a planar surface that is inclined to the axis of said shaft at an angle of between ten and fifteen degrees.

* * * * *